Patented May 26, 1942

2,284,369

UNITED STATES PATENT OFFICE 2,284,369

HYDROGENATED CARDANOL AND METHODS OF MAKING THE SAME

Solomon Caplan, New York, N. Y., assignor to The Harvel Corporation, a corporation of New Jersey No Drawing. Original application July 6, 1934, Serial No. 733,986. Divided and this application November 1, 1938, Serial No. 238,165

4 Claims. (Cl. 260—624)

The present invention relates to new compositions of matter and to methods and steps of making and using the same; and the present invention relates, more particularly, to derivatives of phenols obtained from cashew nut shell liquid and to processes of preparing the same.

Cashew nut shell liquid is described as consisting of about ninety per cent of anacardic acid $C_{22}H_{32}O_3$ and about ten per cent of cardol, $C_{32}H_{52}O_4$, with very small fractional percentages of other materials.

Cashew nut shell liquid has been distilled at a greatly reduced pressure or in a stream of steam at atmospheric pressure to produce a compound having a molecular weight of 288, a boiling point of 225° C. at about 10 millimeters of mercury, an empirical formula of $C_{20}H_{32}O$, and a probable structural formula of $C_{14}H_{27}C_6H_4OH$. Characteristics and reactions indicate that this compound is a phenol with all or parts of the $C_{14}H_{27}$ atoms together as one radical in the meta position with respect to the ·OH radical and with one unsaturated bond,

somewhere in the $C_{14}H_{27}$· group of atoms. This production of the new compound apparently takes place by the breaking down of the anacardic acid. Hereinafter, the new compound is called cardanol.

When cashew nut shell liquid is distilled in air at normal pressure it is cracked into a number of compounds having various boiling points over a wide range; but when cashew nut shell liquid is distilled at the reduced pressure of about ten millimeters of mercury the cardanol comes over uniformly at about 225° C. and when the cardanol itself is distilled at ten millimeters of mercury the boiling point of about 225° C. is constant. Also when the cardanol is distilled from cashew nut shell liquid at atmospheric pressure while steam is blown through it, for illustrative example at about 270° C., the product, cardanol, comes over uniformly, actually in the form of an emulsion, the water of the condensed steam being dispersed in the new compound.

Due to the conditions of various methods of removing cashew nut shell liquid from the cashew nut shells, the proportion of cardanol obtained from a given amount of cashew nut shell liquid varies with the resulting state or condition of the cashew nut shell liquid. That is to say, in all present commercial methods of obtaining cashew nut shell liquid from the cashew nuts heat is used, either to char or carbonize the shells for opening them or for expelling the shell liquid from the shells, and the degree of temperature at which some of these methods are carried out is such that cracking of cashew nut shell liquid occurs with the consequent production of compounds which distill over with the cardanol and which turn dark on exposure to the light. This is a great disadvantage because most of the uses to which cardanol are put require a light color in the final product, for example, in coatings, varnishes, molded compositions, bottlecap paper, electrical insulation, and so on. Further, the greater the degree of purity of the cardanol the greater is the suitability of this compound and its derivatives for their uses. This disadvantage is overcome either by obtaining the cashew nut shell liquid at normal temperature as by solvent extraction or by keeping the nuts at a comparatively low temperature when heating to expell the shell liquid, for example, at below 400° F. The difficulty is overcome also by changing the darkening compounds which go over with the cardanol into compounds which will not go over with it, as by oxidation, for example. This is done by blowing air or oxygen through the cashew nut shell liquid before distillation of the cardanol or by blowing the cardanol with these same materials before it is redistilled for purification, this blowing being done preferably with the cashew nut shell liquid or the cardanol on the alkaline side. This oxidation can also be effected by the use of hydrogen peroxide or of bleaching powder or oxidizing agent which will not oxidize the cardanol.

I have discovered that various derivatives of cardanol can be made which have certain characteristics which make them useful in the chemical and other arts. Illustrative examples of methods of preparing derivatives of cardanol are given below together with descriptions of these materials and statements of their uses.

Hydrogenated cardanol

A new compound $C_{20}H_{34}O$, corresponding to cardanol but in which the unsaturated bond,

is saturated with hydrogen to form,

is made by hydrogenating cardanol or by hydrogenating cashew nut shell liquid before the distillation thereof either with steam or under reduced pressure at about ten millimeters of mercury. This hydrogenation is best carried on by bubbling hydrogen through cashew nut shell liquid or cardanol in contact with a catalyst at normal or increased pressure and at normal or increased temperature, for example, at about 180° C. Illustrative examples of catalysts found to be suitable for this purpose are copper, nickel, palladium black, platinum black, or mixtures of some or all of these, e. g., a mixture of copper and nickel. The catalysts are most effective in the finely divided state and/or supported on a carrier such as infusorial earth.

Characteristics of hydrogenated cardanol

Molecular weight ............................ 290
Empirical formula ........................... $C_{20}H_{34}O$
Structural formula, accepted ........ $C_6H_4\begin{smallmatrix}OH\\C_{14}H_{29}\end{smallmatrix}$ (1,3)
Melting point ................................ About 50.5° C.
Boiling point ................................. About 380° C. (240° C. at 10 mm. Hg).
Appearance ................................... White crystals.

Cardanol ethers

By mixing cardanol with di-ethyl sulphate a reaction is obtained which gives ethyl cardanol, presumably according to the formula:

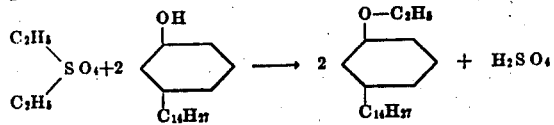

This reaction is carried on in the presence of a sufficient amount of NaOH (or other suitable material) or water solution thereof to neutralize the $H_2SO_4$ which is formed. When dry NaOH is used the equivalent amount of diethyl sulphate is used, but when the water solution of NaOH is used, twice the equivalent amount of diethyl sulphate is necessary because in the presence of water the final by-product is the sodium ethyl sulphate. Similarly, ethyl chloride can be used to supply the ethyl group, but the equivalent amount is used whether the caustic material is used in the solid or dissolved form because the intermediate and final by-products are the same in both cases. Also, ethyl alcohol can be used to supply the ethyl group in which case a small amount of sulphuric acid is used as a catalyser. In every case heating under a reflux condenser speeds the reaction. When the caustic in solution is used the temperature can be about 100° C. and when the solid caustic is used the temperature can be higher, for example, at 150° C. The strength of the caustic solution can be about ten per cent. The resulting ether is separated from the water solution as by a separatory funnel, washed with water to remove traces of the solution, and can be purified by distillation under reduced pressure, for example, at ten millimeters of mercury.

Characteristics of ethyl cardanol

Molecular weight ............... 316
Empirical formula ............... $C_{22}H_{36}O$
Structural formula, accepted ... $C_6H_4\begin{smallmatrix}O-C_2H_5\\C_{14}H_{27}\end{smallmatrix}$ (1,3)
Index of refraction ............... $N_D^{24}$ 1.4995
Boiling point ..................... About 235° C. at ten millimeters of mercury.
Melting point .................... Below minus 20° C.
Specific gravity .................. 0.906 at 20°/4° C.
Color (in liquid state) .......... Pale yellow, lighter than straw.
Color stability .................. No change in 24 hours at 105° C.

Methyl cardanol is made with di-methyl sulphate, methyl chloride, or methyl alcohol or equivalent thereof and cardanol by methods similar to those used for making ethyl cardanol. Methyl cardanol is slightly darker than ethyl cardanol and the color is stable. Likewise, the other alkyl ethers of cardanol can be made by the same steps, using the corresponding starting compounds.

The corresponding ethers of the hydrogenated cardanol are also made by methods similar to those used for making the ethers of cardanol.

Cardanol esters

An illustrative example of the making of cardanol esters is as follows: cardanyl benzoate being the product obtained by this particular example.

Mix 55 parts by weight cardanol and 40 parts by weight benzoyl chloride, which latter is 10% in excess of the molecular equivalent, and add about 15 grams NaOH in a 15% water solution to neutralize the HCl formed. Leave the above mixture stand for reaction (exothermic), after which remove the water layer, wash with dilute (or weak) acid to break the NaOH emulsion, wash with water, separate the water, and distill the resulting cardanyl benzoate to purify it.

Characteristics of cardanyl benzoate

Cardanyl benzoate has the following characteristics:

Empirical formula ............... $C_{27}H_{36}O_2$
Structural formula, accepted ... $C_6H_4\begin{smallmatrix}O \cdot OC \cdot C_6H_5\\C_{14}H_{27}\end{smallmatrix}$ (1,3)
Index of refraction ............... $N_D^{24}$ 1.5305
Boiling point ..................... Approx. 290° C. at 7 mm. of mercury.
Melting point .................... Below minus 20° C.
Specific gravity .................. 0.991 at 20°/4° C.
Color ............................
Color stability .................. No change in 24 hours at 105° C.

Another example of an ester of cardanol is cardanyl acetate which is made by reacting acetyl chloride with cardanol, under conditions similar to those described above for the making of cardanyl benzoate, the product having the formula, $CH_3COOC_6H_4C_{14}H_{27}(1,3)$.

Acid ethers

The corresponding acid ethers are made by using, for example, alpha-chlorpropionic acid or chloracetic acid and cardanol to obtain cardanol propionic acid, $C_{14}H_{27}C_6H_4OC_2H_4COOH$ or cardanol acetic acid, $C_{14}H_{27}C_6H_4OCH_2COOH$, respectively, and hydrochloric acid.

Uses

Hydrogenated cardanol is useful as a plasticiser for cellulose products, for cellulose acetate lacquers, for example; is useful for making light colored oil soluble resins, for example, by reaction with formaldehyde with the aid of an acid or alkaline catalyst; and serves as a fixative for perfumes. Its alkyl ethers, for example the ethyl ether of cardanol, are useful as high boiling liquids for the transfer of heat and for use in two-liquid boilers to replace mercury, the advantages being stability under heat, extremely high boiling points (above 360° C.), mobility at low temperatures, relatively low density and non-toxicity.

The ethers of cardanol and also of hydrogenated cardanol are useful as plasticisers for cellulose lacquer materials and as fixatives for perfumes.

Cardanol acetic acid ether is a waxy solid which can be used as part or all of the acid for the characteristic reaction with polyhydric alcohol and acid anhydrids to form resins of the alkyd or glyptal type. The advantages of the resins produced are greater resistance to moisture and solubility in drying oils.

The esters of cardanol find a number of uses hitherto not generally characteristic of this class of compounds. For example, cardanyl benzoate has an odor similar to leather, particularly Russia leather, and can be used to give Russia leather odor to other leathers and to artificial leather.

The hydrogenated cardanol, $C_{20}H_{34}O$, and also some of the other cardanol derivatives named above, can be reacted with the aldehydes, formaldehyde, paraformaldehyde, hexamethylenetetramine, furfuraldehyde and so on, with or without a catalyst, acid or alkaline, to form condensation products which can be brought to a resinous state with heat. And these condensation products are light colored and have little or no odor.

The present application is a division of my copending application Serial Number 733,986, filed July 6, 1934, patented November 28, 1939, Number 2,181,119.

Having thus described my invention what I claim and desire to protect by Letters Patent is:

1. The hydrogenated compound derived from the anacardic acid constituent of cashew nut shell liquid having the following formula:

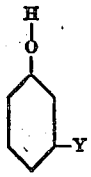

wherein Y stands for the completely hydrogenated normally unsaturated aliphatic side chain of the alkyl phenol which is obtained by destructively distilling cashew nut shell liquid at reduced pressure, said hydrogenated compound in the purified state being a white crystalline material having a melting point of about 50.5° C. and a boiling point of about 240° C. at 10 millimeters of mercury.

2. In methods of obtaining the product of claim 1 from material of the group consisting of cashew nut shell liquid and cardanol, the step which comprises completely hydrogenating the normally unsaturated aliphatic side chain which is characteristic of the anacardic acid constituent of cashew nut shell liquid and of cardanol.

3. The method of making hydrogenated cardanol from cashew nut shell liquid which comprises hydrogenating cashew nut shell liquid to satisfy the unsaturated bond in the alkyl side chain of the anacardic acid constituent with hydrogen and subsequently destructively distilling to separate hydrogenated cardanol from the residual cardol constituent.

4. The method which comprises hydrogenating to saturation, with the aid of a hydrogenation catalyst, an alkyl phenol which is known as cardanol and which is identified as being obtainable by destructively distilling cashew nut shell liquid at reduced pressure and as having a boiling point of about 225° C. at 10 millimeters of mercury, the completely hydrogenated product having the following structure:

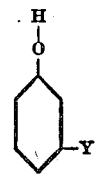

wherein Y stands for the completely hydrogenated normally unsaturated aliphatic side chain of said cardanol.

SOLOMON CAPLAN.